United States Patent [19]

Morash

[11] Patent Number: 4,843,991

[45] Date of Patent: Jul. 4, 1989

[54] SURFACE EFFECT TRANSPORT VEHICLE INCLUDING IMPROVED LIFT MEANS

[75] Inventor: Daniel Morash, Marly le Roi, France

[73] Assignee: Seaglider Concept S.A., Rueil Malmaison, France

[21] Appl. No.: 113,231

[22] Filed: Oct. 26, 1987

[30] Foreign Application Priority Data

Nov. 5, 1986 [FR] France ................. 86 15405

[51] Int. Cl.$^4$ .................. B63B 1/38; B60V 1/11
[52] U.S. Cl. .................. 114/67 A; 180/118; 180/122; 180/127
[58] Field of Search ............. 114/67 A; 180/116–122, 180/127–130

[56] References Cited

U.S. PATENT DOCUMENTS

| 3,141,436 | 7/1964 | Cathers et al. | 114/67 A |
| 3,362,499 | 1/1968 | Tripp | 180/128 X |
| 4,433,745 | 2/1984 | Rollins et al. | 180/127 X |

Primary Examiner—Sherman D. Basinger
Attorney, Agent, or Firm—McAulay Fisher Nissen & Goldberg

[57] ABSTRACT

A surface effect transport vehicle is provided having a structure supported by a cushion of pressurized air generated from a blower. The propulsive source of the vehicle is independent from the power source of the blower. The propulsion source includes at least one retractable propeller device adapted to be made operative during travel over the water and nonoperative during travel over land, and at least one retractable wheel device, for travelling over land or in shallow water, which is made operative when the propeller device is retracted to its nonoperaitve condition, and vice-versa. Preferably the wheel device has at least two lateral faired propellers operative when the propeller device for propulsion over water is retracted to its nonoperative position. The supported structure includes automatic controls that simultaneously controlling the lift properly speaking, the attitude of the vehicle as well as its stability when passing over an obstacle or at the time of a dynamic disturbance. The automatic controls also ensure identity of response of the vehicle to different outside forces whatever the load thereof.

24 Claims, 17 Drawing Sheets

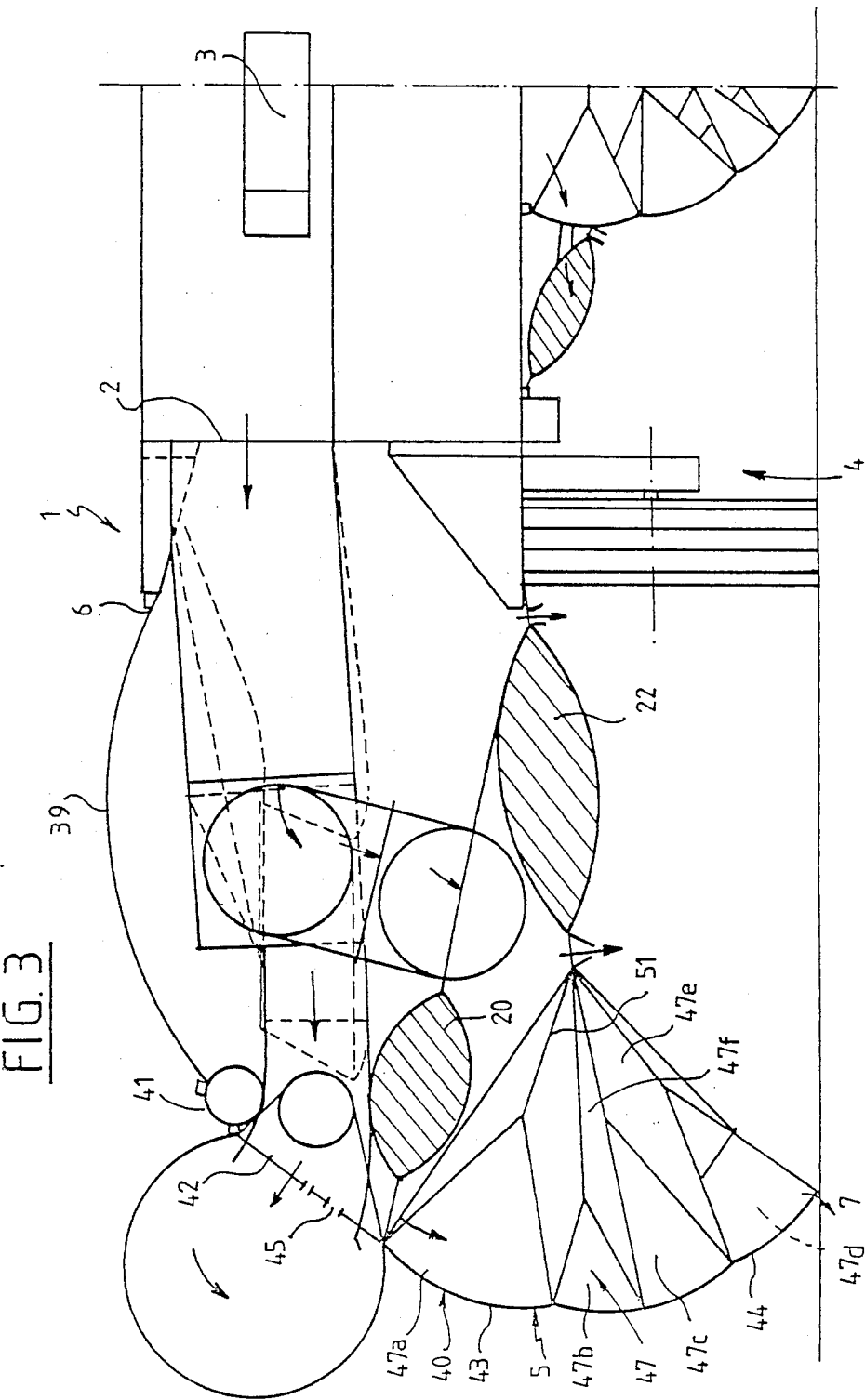

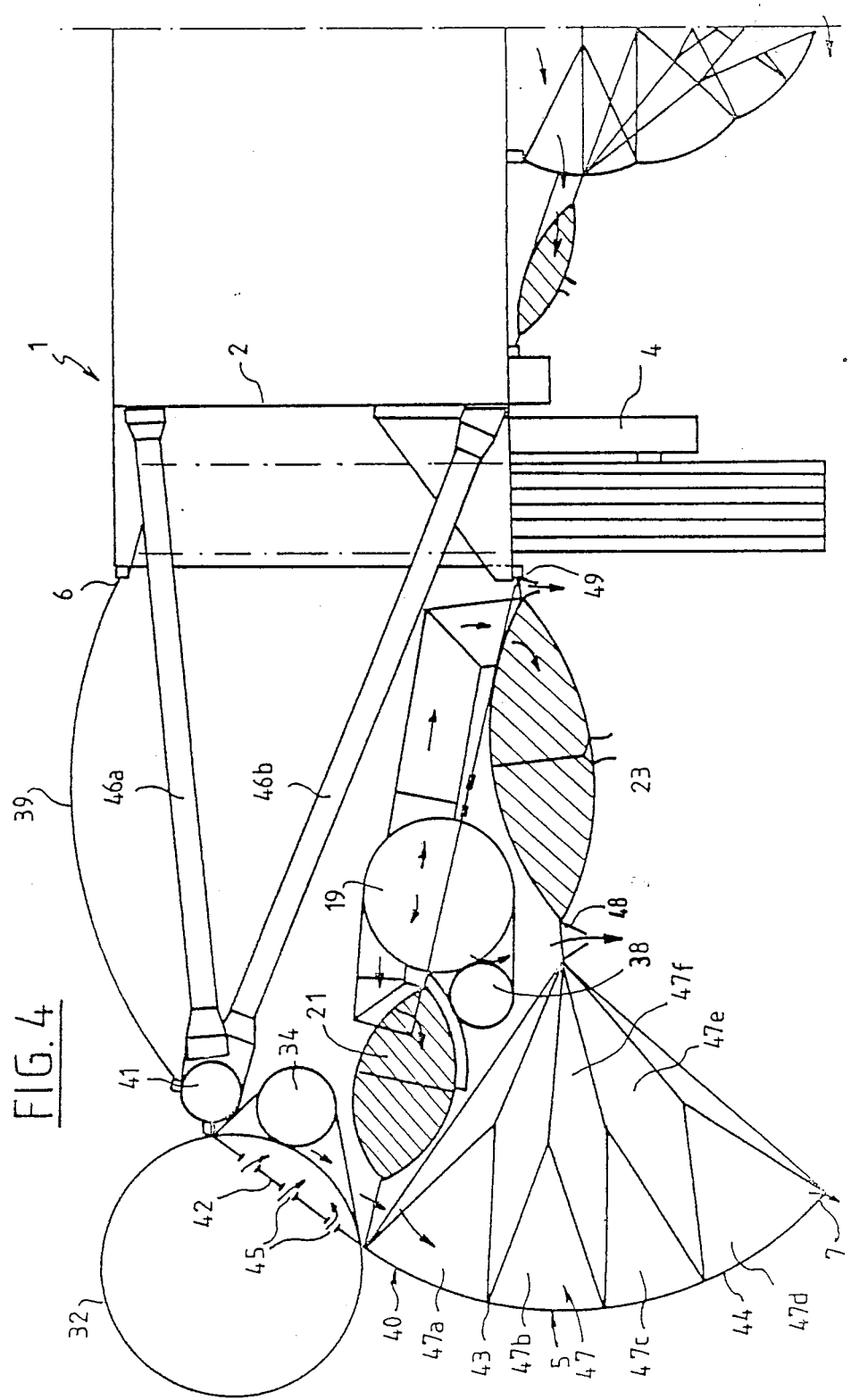

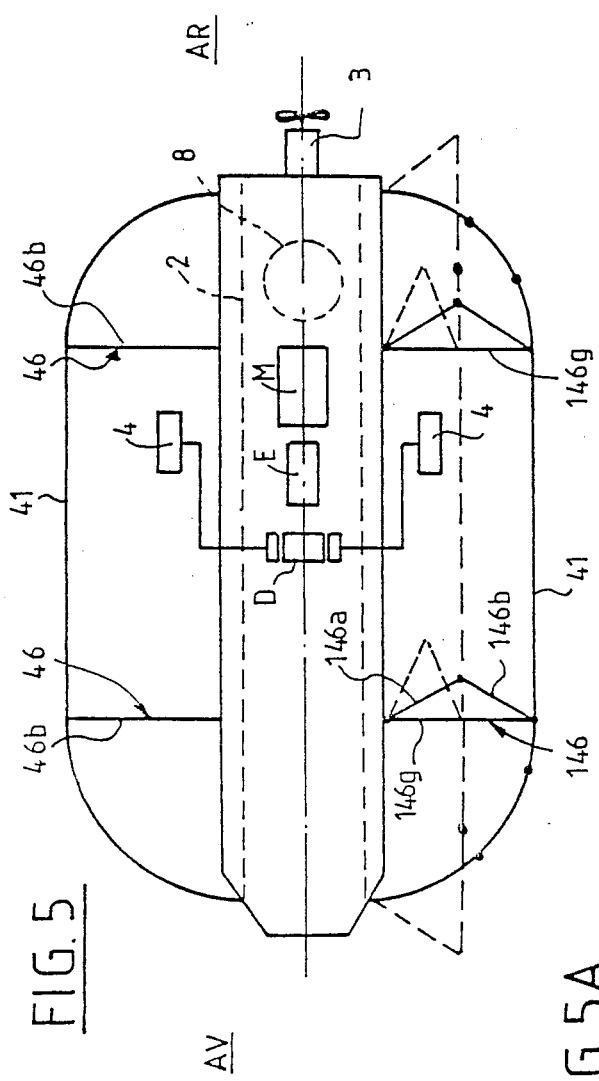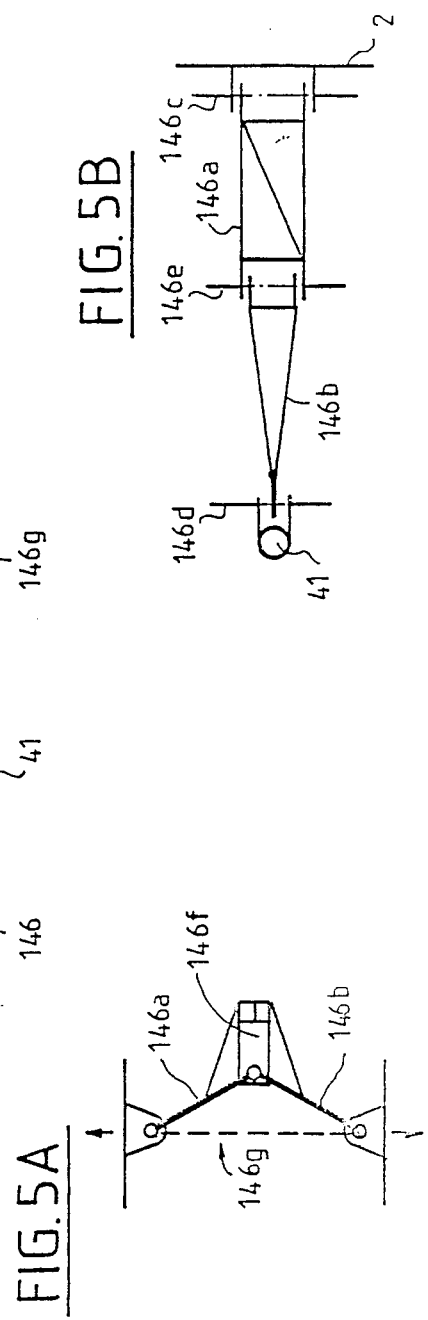

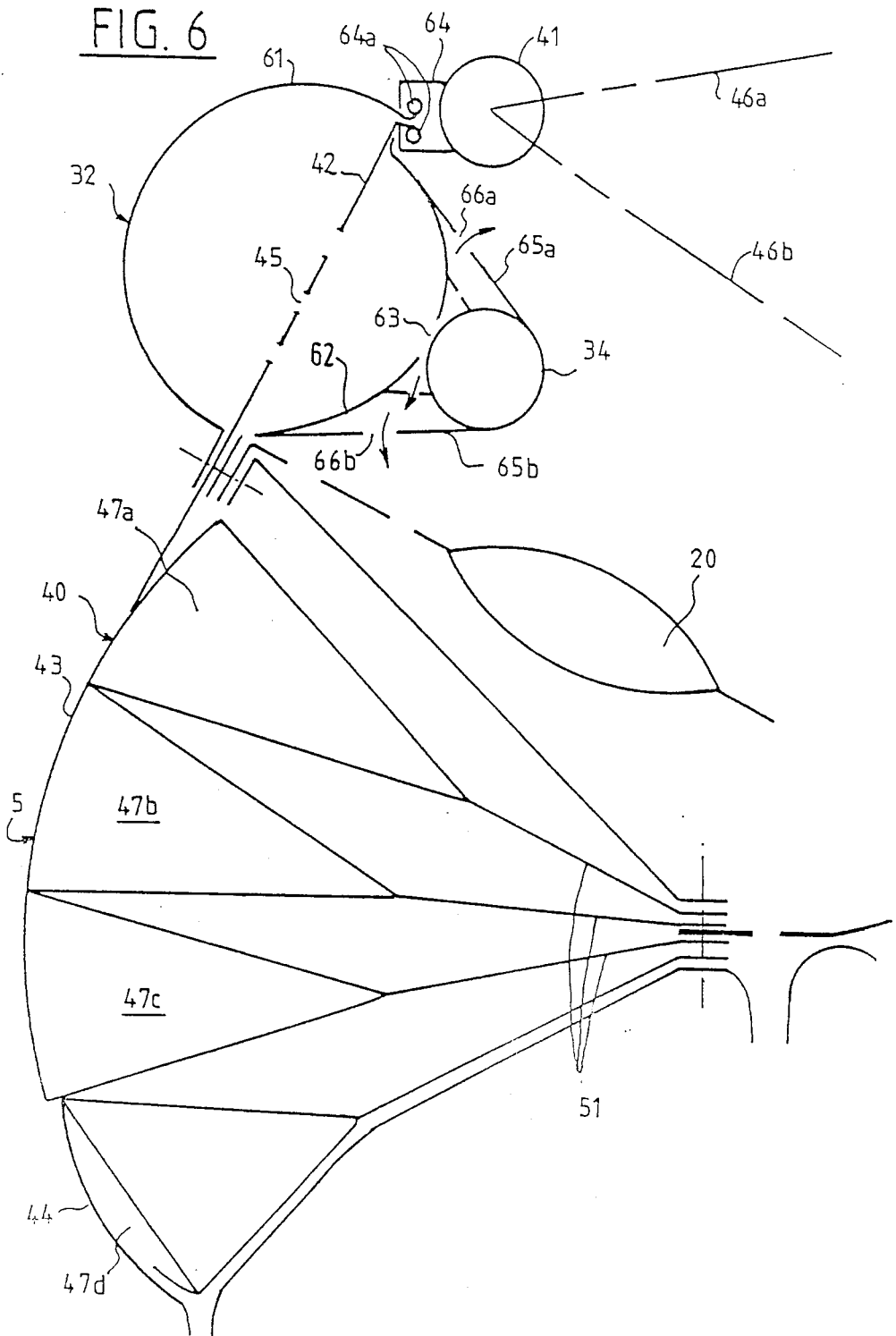

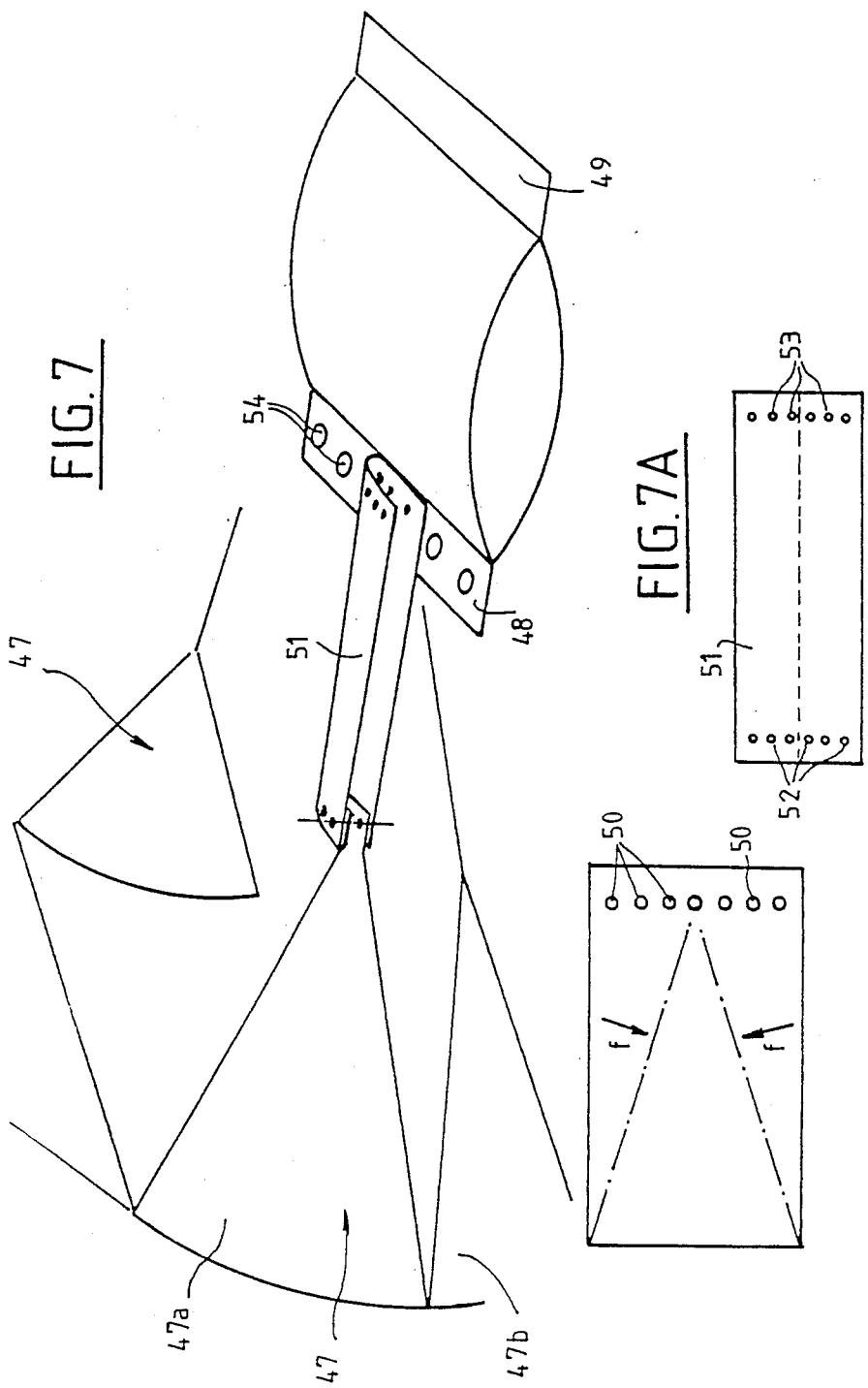

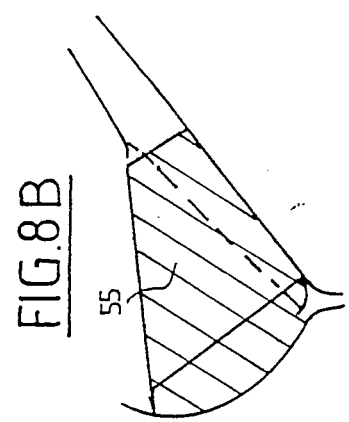
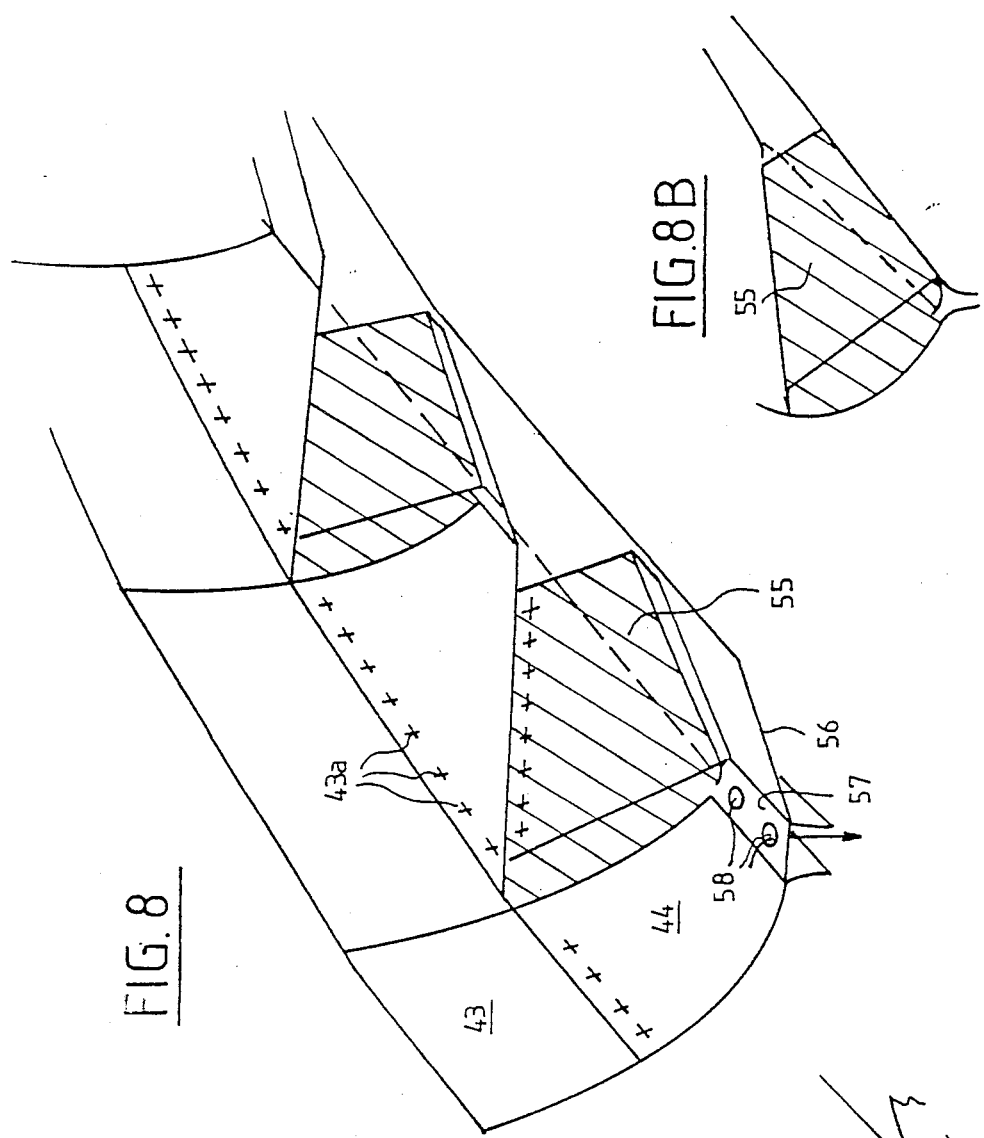
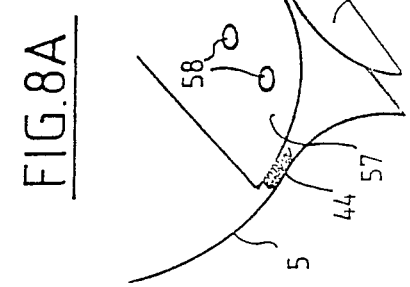

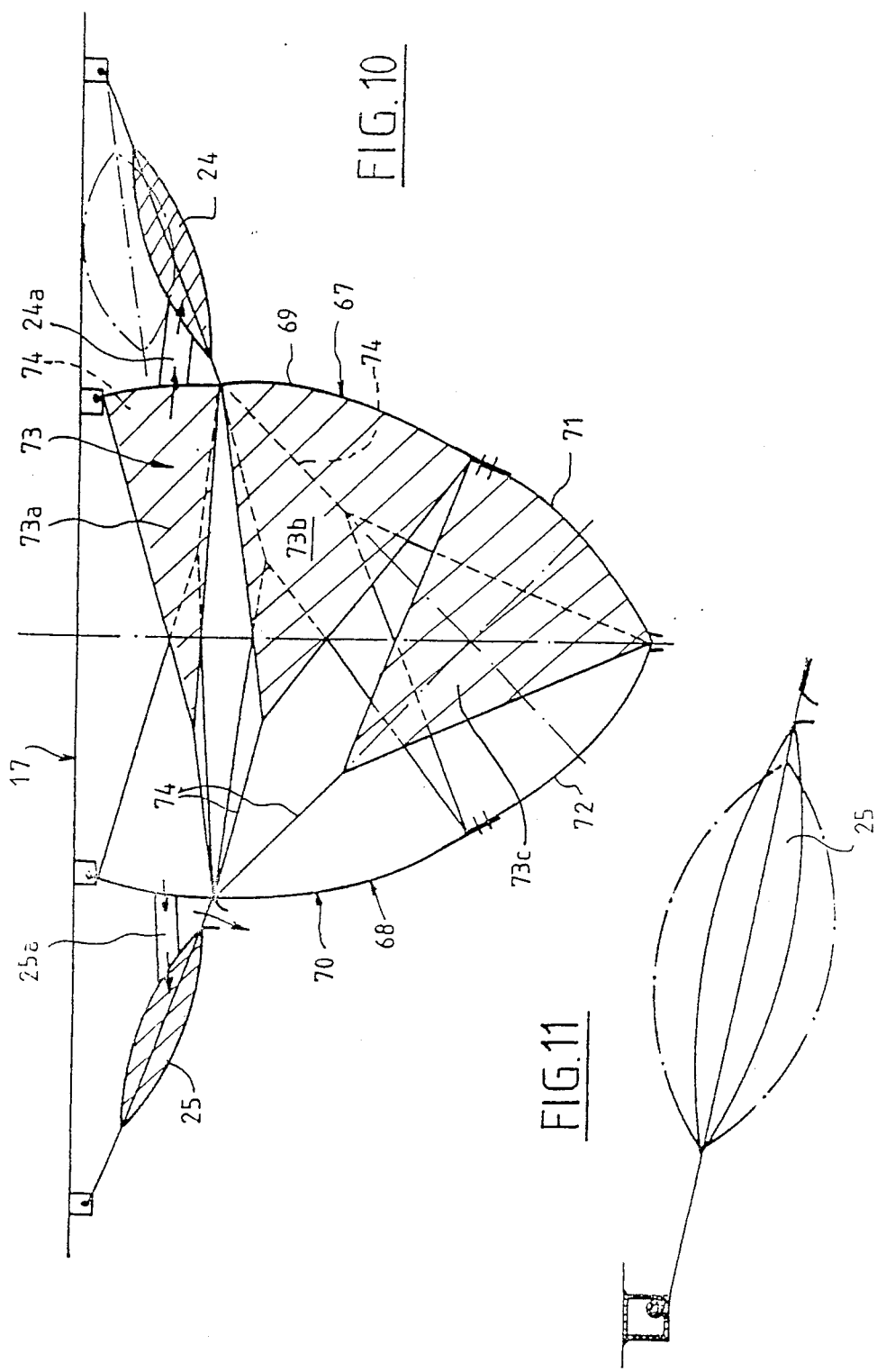

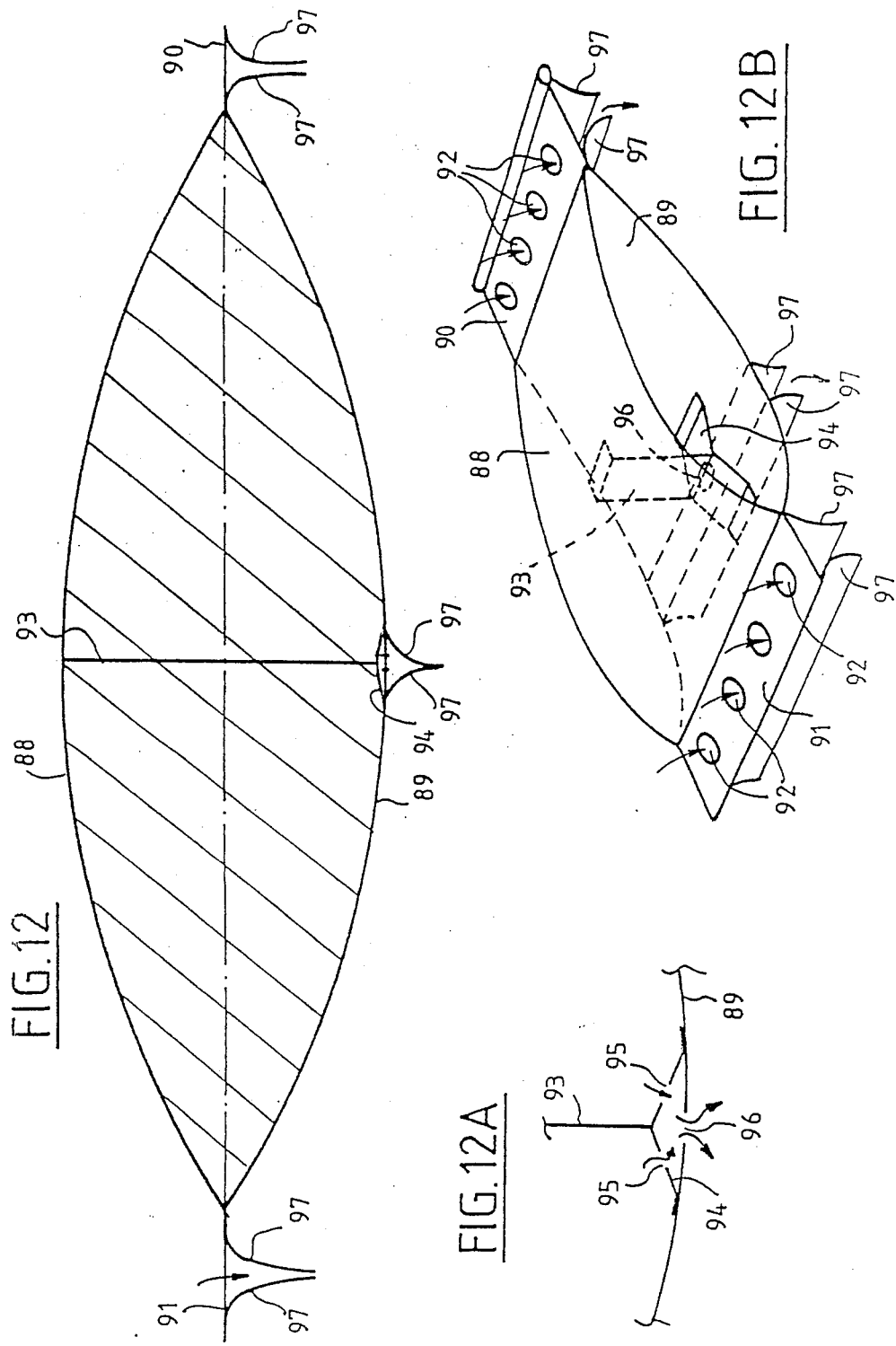

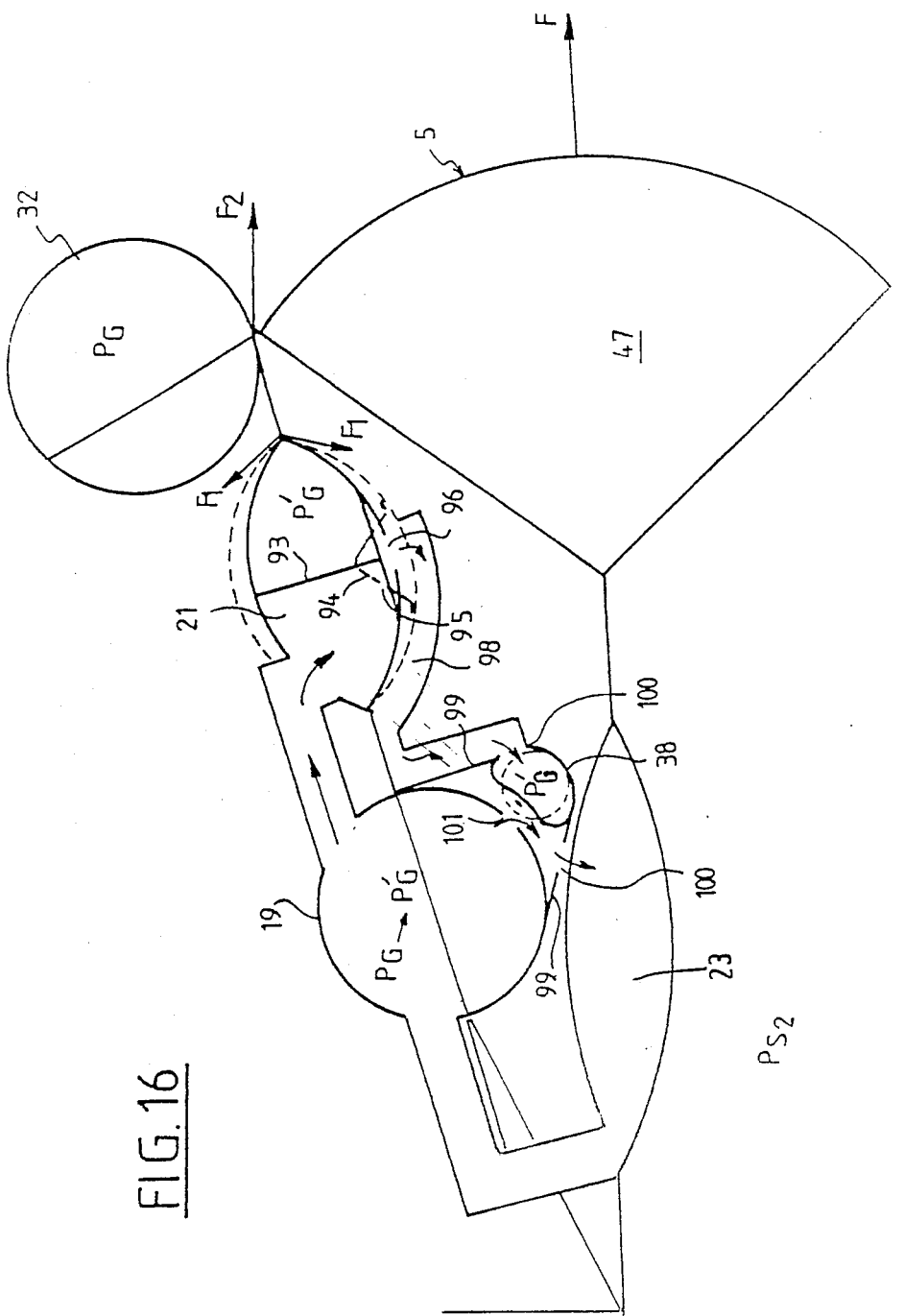

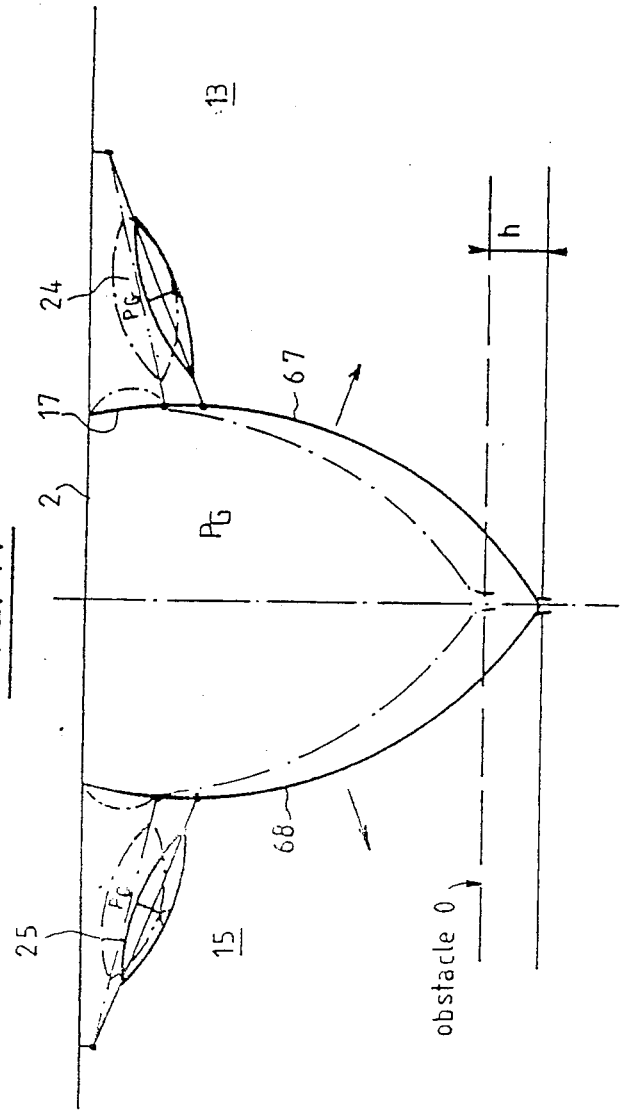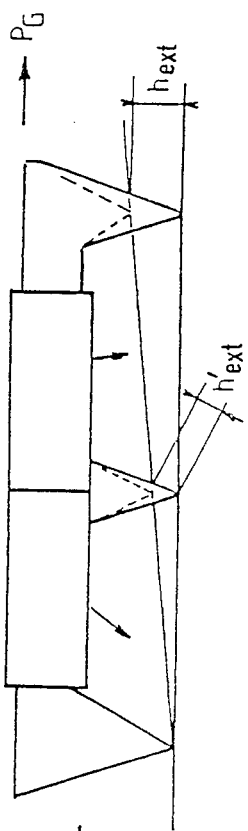

SURFACE EFFECT TRANSPORT VEHICLE INCLUDING IMPROVED LIFT MEANS

The present invention relates to a transport vehicle comprising a structure supported by pressurized fluid cushions or air cushions, called a surface effect vehicle. This vehicle may be adapted for travelling over water and/or over land.

The present invention relates more precisely to surface effect vehicles having a lifting structure, at the periphery of which is disposed a skirt made from a flexible and supple material, which defines an air cushion fed by pressurized air generating means.

In known ships of this type, the lift is created by a turbine or aerial propeller feeding, through a duct, the lift cushion directly, which is defined by skirts fixed directly to the structure.

Such systems require a considerable leak height so as to provide dynamic stability of the aircushion by air lamination effect, the leak height being the distance, during operation of the vehicle, between the surface of the medium (land, water) over which it is travelling and the lower edge of the skirt.

The greater the leak height, the greater the amount of fluid (air) which must be supplied for creating the cushion and, consequently, the greater the energy consumption. It is then desirable for this leak height to be as small as possible, for this reason and also for increasing the static stability of the vehicle. In fact, if this latter is destabilized, when it is in operation, because of the presence of any obstacle (wave for example) it must be able to find a stable position again very rapidly by viscosity, that is to say by laminating the air at the outlet from the skirt, so as to avoid vibrations. This requirement involves a relatively large leak height.

To this drawback is added the fact that the dynamic stability of the above mentioned vehicles remains relatively low and that it is necessary to provide ballast systems which compensate for the movement of the center of gravity so as to replace it in the thrust center. Such ballast systems consist of water reservoirs situated at the front and at the rear of the vehicle, these reservoirs communicating with each other. However, the delay in transferring liquid from one reservoir to another is not immediate, so that the balanced position is not rapidly reestablished. This condition requires considerable lift powers so as to obtain high transport speeds.

Another consequence of the lack of dynamic and static stability, that is to say high return torques rapidly righting the vehicle subjected to a disturbance, is that the use of conventional aquatic (sea propellers) and land wheel (wheel) propulsive systems is made difficult, for such systems generate high nose-up and nose-down torques. In fact, known vehicles use an aerial propulsive system whose thrust is close to the center of gravity. Now, aerial propulsive systems are not adapted to slow speeds, for they are power consumers at low speeds. We will add the drawback of poor comfort for the passengers to the extent that the shock absorbing in the vertical plane is correlated to the leak height and is only correlated therewith.

Furthermore, direct fitting of the skirts on the structure results in parasite drag forces by scoop effect; in fact, the skirt does not readily retract in front of the wave and "beheads it", whence the drag force mentioned above, which results in an increased power consumption for high speeds.

The present invention overcomes these drawbacks. For this, in accordance with the invention a skirt is provided whose position which controls the lift and attitude can be adjusted, and which allows very high static stability gains to be obtained and, consequently, allows the vehicle to be operated with a low leak height, even when faced with obstacles; the power consumption may thus be reduced and do away with carrying ballasts, because the balance position may be reestablished substantially automatically.

A surface effect transport vehicle in accordance with the invention, having a structure supported by a cushion of pressurized air generated from a blower and propulsive means is characterized in that said propulsive means are independent of the means providing the lift and include:
  at least one retractable propeller device adapted to be made operative during travel over the water and non operative during travel over land;
  at least one retractable wheel device (or the equivalent means) for travelling overland or shallow water, which is made operative when the propeller device is retracted to its non operative condition, and vice versa.

For travelling over land, shallow water or marshy type land, at least two lateral faired propellers are provided associated with a retractable wheel device and which are operative when the propeller device for propulsion over water is retracted to its non operative position.

The supported structure includes means which simultaneously control the lift properly speaking, the attitude of the vehicle as well as its stability when passing over an obstacle or at the time of a dynamic disturbance, said means also ensuring identity of response of the vehicle to different forces whatever the load thereof.

The supported structure is divided into at least two chambers in which static lift pressures reign slaved to one another by control and/or monitoring means and it is advantageously divided into at least four chambers limited at their external periphery by a flexible skirt of modifiable shape and inwardly by a longitudinal substantially median dividing wall as well as a transverse dividing wall, substantially orthogonal to the longitudinal dividing wall, said longitudinal and transverse dividing walls also having a modifiable shape and communicating with the peripheral space of the air cushion defined by the skirt through at least one orifice.

The peripheral skirt includes at least two parts the first of which is fixed, on the one hand, to the supported structure and, on the other hand, to at least one hoop having in a plane view substantially the shape of the gunwale of the vehicle, the second part of the skirt being fixed at its upper part to said hoop and extending from said hoop as far as the vicinity of the surface over which the vehicle moves.

In an advantageous embodiment, the hoop is connected to the support structure by a deformable articulated framework.

To facilitate maintenance of the vehicle, the second part of the peripheral skirt includes a section adjacent the hoop, pierced with a plurality of openings and at least two other sections, the first of which is integral with that with perforations and the second of which—which forms a wear strip—is fixed to the first one by bolts or similar.

According to another essential characteristic of the invention, the modification of shape of the peripheral skirt and of the dividing wall is controlled by pneumatic "muscle" means.

So as to obtain this modification of shape of the peripheral skirt and of the dividing walls, controlled from the muscles, fabric systems are provided disposed perpendicularly to said skirt and/or to the walls defining said longitudinal and transverse dividing walls, the connection of a fabric system to the muscle which is associated therewith being provided by means of a tie rod such as a strip or similar.

This latter is advantageously bent on itself along its longitudinal median line and has transverse edges each having a row of holes for the passage of fixing members, such as bolts or similar, for fixing to the fabric system on the one hand and to the muscle which is associated therewith, on the other.

The fabric system associated with the peripheral skirt includes fabric portions which are triangular, after folding, and fabric portions with a quadrilateral contour joined together so that said peripheral skirt is constantly in a stretched position during operation of the vehicle.

In a preferred embodiment, the fabric systems associated with the wear strip of the peripheral skirt are reinforced by a second fabric portion with which is associated a second wear strip disposed opposite the first wear strip and at a distance therefrom, with interpositioning between said two wear strips of a strip with central perforations.

With the wear strip are associated, on the external face thereof, a flap and a louver for deflecting spray and/or dust met with during travel of the vehicle over water and over land.

In a particularly preferred embodiment, the muscles each include two flexible superimposed strips enclosing inwardly members of the valve type, the edges along which said two strips are joined forming means for connection to the fabric systems, on the one hand, and to the supported structure, on the other.

The valve type members are formed by strip devices pierced with air passage orifices and, in such a construction, the lower muscles associated with the peripheral skirt and the muscles associated with the longitudinal and transverse dividing walls further include longitudinal louvers for guiding the air likely to escape through perforations disposed in lateral rows at both longitudinal ends of said muscles and in a central row of holes formed in one of the walls of said muscles.

For supplying the muscles controlling the peripheral skirt from the blower, the invention provides a duct and, for generally supplying the supporting air cushion, an external peripheral tube cooperating with the first perforated part of the skirt and inner tubes associated with the external peripheral tube by lateral strips with central perforations.

The inner tubes are in communication, at their end, with the inner space of the longitudinal and transverse dividing walls to which they are adjacent through a valved duct and the muscles for operating the longitudinal and/or transverse dividing walls are controlled from the pressure reigning in said dividing walls to which they are connected by channels.

For regulating the air pressure coming from the blower in the distribution ducting, a tube is disposed close to the inlet zone of said ducting in the front and/or rear chamber of the vehicle, said tube being in communication with the upper muscle disposed in said front and/or rear chamber through a pipe, the tube being further held in contact with the ducting by perforated strips.

For flight position stabilization of the vehicle, in response to a variation of the position of the center of gravity or of the load causing a variation of the static pressure in the lift chambers, the internal pressure of the lower muscles and of the upper muscles is regulated through leak holes in the walls of said muscles.

In stationary flight, the leak rate is substantially the same in the front and rear lift chambers, the static pressures in said chambers being regulated from lower tubes having valves, on the one hand, and, on the other hand, by external peripheral tubes with leak holes associated with the front and rear chambers.

Furthermore, the device of the present invention allows a skirt to be proposed for surface effect ships which does not "behead" the wave, as is the case of known vehicles, in which the skirt, if obstacles are met by the ship, oppose the advancing movement of this latter. On the contrary, in the present invention, in all circumstances the skirt follows the surface over which it is travelling, independently of the obstacles which it may meet.

One consequence is that the material forming the skirt will have much less chance of wearing out and being damaged, in comparison with skirts of known vehicles of this type.

Finally, with the vehicle of the invention, the shock absorbing system is formed by the skirt whose essential characteristics have just been mentioned, so that the fact that the leak height is small has no influence on the shock absorbing. Moreover, the shock absorbing obtained in accordance with the invention, is better, since the kinetic energy is better absorbed, for over a greater height, because of the intervention of the skirt.

In fact, when passing over an obstacle causing a drop of the pressure differential between that reigning in the muscle and that reigning in the lift chambers, a lengthening of said muscles results in a movement raising the skirt which increases the shock absorbing height which is multiplied by a factor of the order of 10 to 20.

To give a better understanding of the object of the present invention, one embodiment of a surface effect vehicle in accordance with the invention will be described in detail, hereafter, by way of indication and in no wise limiting, with reference to the accompanying drawings, in which FIG. 1 is a partial schematical bottom view of the vehicle whose advancing direction is shown by the arrow F in this Fig.;

FIGS. 2, 3 and 4 are sectional views through lines II—II, III—III and IV—IV of FIG. 1, lines II—II and III—III being broken lines;

FIG. 5 is a bottom view of the vehicle without the skirt and the dividing walls, FIG. 5a showing on a larger scale the detail D of FIG. 5 and FIG. 5b being a schematical side view of the system shown in FIG. 5A;

FIG. 6 is an enlarged view of the part situated in the left hand end zone of FIG. 4, showing different additional assembly details, FIG. 7 is a perspective view of the system for connecting the skirt to a first associated muscle, itself connected to the structure of the vehicle;

FIG. 7A is an exploded view of the different elements for forming the assembly shown in FIG. 7, FIG. 8 is a perspective view of the lower skirt portion and FIGS. 8A and 8B are two detailed views of FIG. 8;

FIG. 10 is a cross sectional view of the longitudinal dividing wall of the lift device of the vehicle, through line X—X of FIG. 1 and on a greater scale, some portions having been removed for the sake of clarity;

FIG. 11 is a sectional view on a larger scale of the muscle associated with the dividing wall shown in FIG. 10;

FIG. 12 is a cross sectional view of the muscle associated with the skirt, FIG. 12A showing a detail of the valve carried by this muscle, and FIG. 12B being a perspective view of a portion of this muscle showing the fitting of the valve;

FIGS. 13 to 17 and 17A are schematical views for explaining the operation of the vehicle of the invention.

Figure 1:
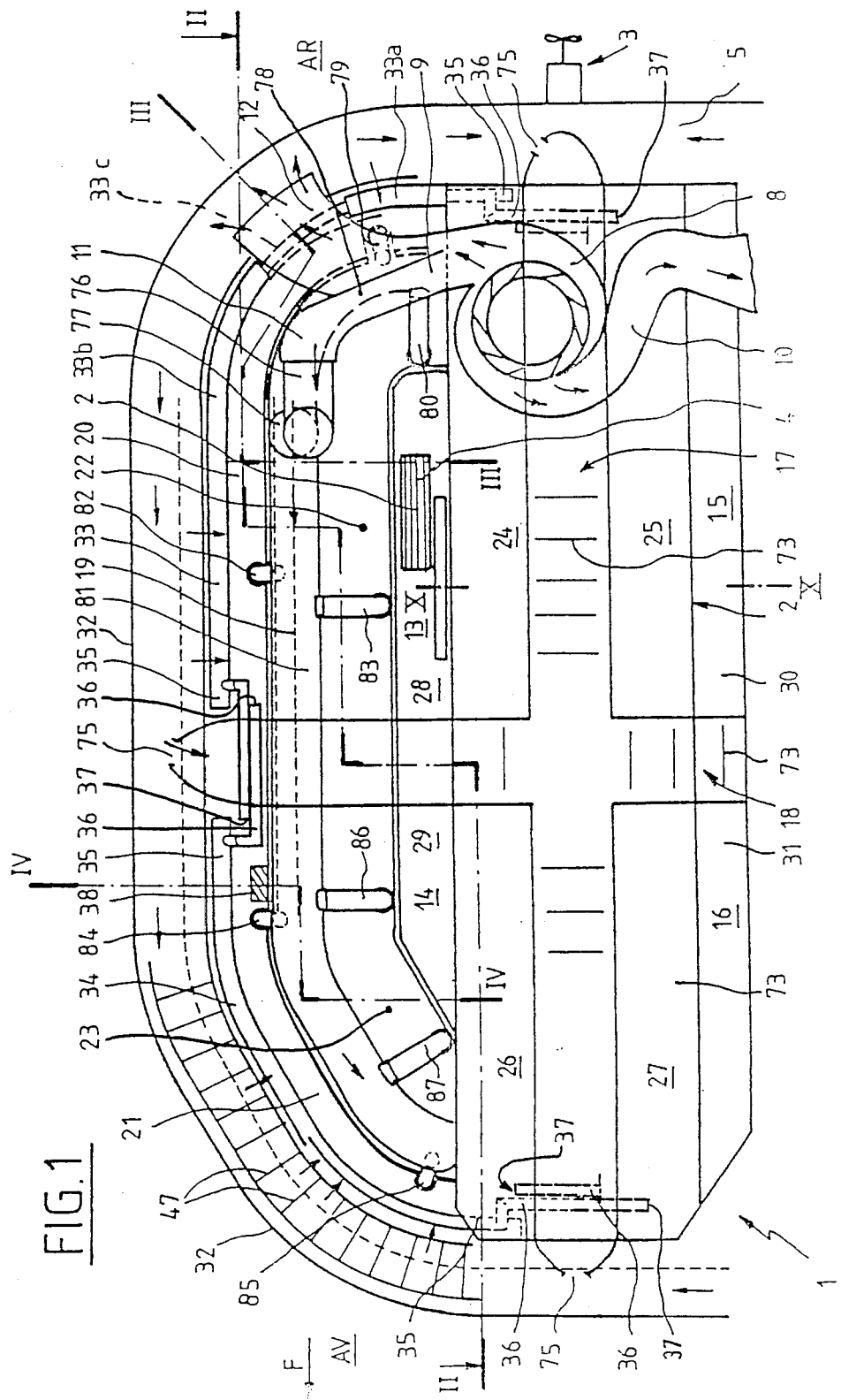

Referring now to FIGS. 1 to 4, there is shown generally by 1 a surface effect vehicle able to travel not only over the sea but also over land or else over shallow water or over marshy type ground. Vehicle 1 includes a supported structure, a device 3 for maritime propulsion, disposed at the rear of the vehicle, a device 4 for land propulsion and a device for providing the lift through a pressurized air cushion. When device 3 is in operation, device 4 is in a retracted position and conversely. However, when the vehicle is about to leave the water or to enter into the water, the two devices 3 and 4 are both in the low position. During travel over shallow water, device 3 is raised and propulsion is provided by means of two faired propellers or turbines 4a forming an integral part of device 4. Jack means, shown schematically by V in FIG. 2, of the hydraulic or pneumatic type, ensure the positioning and retraction of the propulsion devices 3 and 4.

The lift device is formed by a peripheral skirt 5, made from a flexible and supple material, whose upper edge 6 is fixed to structure 2 and whose lower edge 7 is free, the means used for shaping this skirt 5 being described further on.

Skirt 5 defines a lift air cushion fed by a blower 8, with vertical axis, disposed at the rear central part of the structure 2 and adapted to be driven by one or motor(s) M shown schematically in FIG. 5. This blower 8 has two opposite and identical outlets 9 and 10, outlet 10 only being partly shown in FIG. 1.

As can be seen in this Fig., outlet 9 is divided into two branches 11 and 12, the first one 11 branching off towards the inside and the second one 12 branching off towards the outside. Outlet 10 is divided similarly into two branches, for feeding the other longitudinal half of the air cushion with compressed air.

The space defined by skirt 5 is divided into four chambers 13, 14, 15 and 16 by a substantially median longitudinal dividing wall 17, and by a transverse dividing wall 18 which, if required, is slightly offset forwardly with respect to the median transverse line of vehicle 1, without however this arrangement being obligatory. The distribution of the compressed air in each of said chambers is provided through a duct 19 connected to the outlet branch 11 of blower 8 for chambers 13 and 14, it being understood that chambers 15 and 16 are fed in a similar manner by a duct disposed symmetrically with respect to duct 19.

Since the structure of the lift means is the same in the right hand and left hand longitudinal portions of the vehicle, for the sake of convenience only the right hand part will now be described, shown in FIG. 1.

Duct 19 whose direction follows the contour of skirt 5 feeds, through different branch circuits which will be described in detail further on, on the one hand, muscles 20 and 21—associated with chambers respectively 13 and 14—and, on the other, muscles 22 and 23—associated with chambers respectively 13 and 14, offset downwardly and inwardly with respect to said muscles 20 and 21. In each chamber all the muscles are also disposed so as to follow the contour of skirt 5.

These muscles 20 to 23 form the members which control the operation of skirt 5, in other words the variations of its shape which may occur when vehicle 1 is in operation. The choice of the term "muscle" to designate these members is due to their shape—their spindle shape can be seen in the sectional views of FIGS. 2 to 4—and also because of their operating mode, which is similar to that of the muscles of the body, as will be described hereafter. In the same way that muscles 20 to 23 are associated with skirt 5, muscles 24, 25, 26, 27, parallel to said dividing wall 17, are associated with the longitudinal dividing wall 17, muscles 24 and 26 being disposed in chambers 13 and 14, respectively and muscles 25 and 27 being disposed in chambers 15 and 16 respectively. Also, with dividing wall 18 are associated muscles 28, 29, 30, 31 parallel to said dividing wall 18, muscles 28, 29 being disposed in chambers 13 and 14 respectively and muscles 30 and 31 in chambers 15 and 16 respectively. Muscles 24 to 31 are intended to control the position of dividing walls 17 and 18; they are fed with compressed air coming from the dividing wall 17 and 18, themselves fed with compressed air coming from a peripheral tube 32 associated with skirt 5, as will be described hereafter.

The device also includes inner tubes disposed tangentially to tube 32, namely on the one hand a tube 33 disposed in the rear muscle 30 and formed of two segments 33a and 33b, one disposed against the rear part of tube 32 and the other against the lateral tube part thereof, segments 33a and 33b being connected together by an intermediate segment 33c, disposed to the rear of branch 12, looking at FIG. 1 and, on the other hand, a tube 34 disposed in the front chamber 14. The end 35 of each of tubes 33 and 34 which is close to a dividing wall, either 17 or 18 depending on the case, communicates with the chamber through a bent duct 36 having a valve 37 at its end.

Furthermore, in the front part of vehicle 1 there is disposed, close to the inlet zone of duct 19 into chamber 14, a tube 38 of short length whose structure and operation will be described hereafter.

Having now described the general arrangement of the members for controlling the lift of the vehicle 1 of the invention, the particular features of these members will now be described in greater detail: THE PERIPHERAL SKIRT 5:

The skirt will be described in greater detail with reference more particularly to FIGS. 3, 4, 5, 6, 7, 7A, 8, 8A and 8B.

Skirt 5 has two portions, namely an upper portion 39 and a lower portion 40 (see FIGS. 2, 3, 4 and 6). Portion 39 is connected both to structure 2, at 6, for example by bolting, and to a hoop 41 which can be seen in FIG. 5 and which has the shape of an elongate rod curved at both its ends. Vehicle 1 has two hoops 41 disposed symmetrically with respect to the mean longitudinal line of vehicle 1 (FIG. 5). As for portion 40 it, is broken down into three successive sections 42, 43 and 44, the first one 42 of which has a plurality of openings 45 (or which is porous) being connected to hoop 41 and the second one 43 being attached to the preceding one and to the third one 44, which forms a wear strip, as will be described further on.

Each hoop 41 is held by a framework formed, in a first possible embodiment (see in FIG. 5 the right hand half of vehicle 1 with reference to the advancing direction of vehicle 1), from two systems 46 each formed by a pair of tubular tie rods 46a, 46b (FIG. 4). The two tie rods 46a, 46b are bolted at one end to the associated hoop 41 and attached at the opposite end, one 46a to the upper part of structure 2 and the other 46b to the lower part thereof. In said embodiment, tierods 46a and 46b are fixed.

In the lower half of FIG. 5 and in FIGS. 5a and 5b a second possible embodiment of the systems forming the framework is shown. In this case, said systems, bearing the reference number 146, which are particularly appropriate for large sized vehicles, are each formed of two arms 146a and 146b articulated to each other, one 146a being articulated about a shaft 146c carried by the structure 2 and the other 146b about a shaft 146d carried by the hoop 41. With the median shaft 146e is associated a stop 146f for preventing complete opening of arms 146a, 146b. A cable 146g is connected to the two external articulations. Shortening thereof allows the hoop 41 to be moved towards structure 2, said hoop 41 then occupying the position shown with broken lines in FIG. 5. Similarly, the overall size of the vehicle 1 may be reduced for example to facilitate passing through canal locks.

Sections 42 and 43 of portion 40 of skirt 5 are integrally joined together; section 44 is fixed to 43, for example by bolts, rivets or clips 43a (FIG. 8), passing through the two edges overlapping said sections 43 and 44.

Shaping of skirt 5 in sections 43 and 44 is achieved by means of fabric systems 47 spaced evenly apart in planes substantially perpendicular to skirt 5. These fabric systems 47 connect skirt 5 to the longitudinal edge 48 opposite the lower muscles 22 or 23, depending on whether it is a question of chambers 13 or 14 respectively. The opposite longitudinal edge 39 of said muscles 22 and 23 is connected to the superstructure 2 of vehicle 1 (see particularly FIGS. 7 and 4).

As can be seen in FIGS. 3, 4, 5, 6 and 7, for example, each fabric system 47 is formed by three upper fabric portions 47a, 47b, 47c and fabric portions with quadrilateral contours such as 47e, 47f . . . associated with section 43 of skirt 5 and by a lower fabric portion 47d associated with section 44 or wear strip of said skirt 5.

The structure and fitting of these fabric portions will be described with reference to FIGS. 7 and 7a for the upper faric portions 47a, 47b, and 47c and to FIGS. 8, 8A and 8B for the lower fabric portion 47d.

Each fabric portion 47a, 47b or 47c has a rectangular shape and is fixed along a transverse edge to section 43 by any appropriate means. Along the opposite transverse edge fabric portion 47a, 47b or 47c has a row of holes 50. On assembly, the longitudinal edges of each fabric portion 47a, 47b and 47c are drawn close together, as shown by arrows f in FIG. 7, so that holes 50 are superimposed so as form, for example, one or two perforation zones and the fabric portions are assembled together and to the fabric portions 47e, 47f . . . so that the peripheral skirt 5 is constantly in a stretched condition during operation of the vehicle. The connection of the fabric portion system to muscle 22 or 23 is provided by a rectangular elongate strip 51 (FIG. 7A) whose two transversal edges each have a row of holes, respectively 52 and 53.

In the assembled position, strip 51 is folded back on itself along its median and longitudinal line, the free end of a fabric portion 47a, 47b, 47c, or 47e, 47f being sandwiched between the two thus superimposed panels of strip 51, so that the perforated zones formed by holes 50 and holes 52 come opposite each other, which allows connecting means or members to be passed therethrough such as bolts or similar.

Strip 51 is fixed to muscle 22 or 23 using the same principle, except that the assembly formed there by the two superimposed panels of strip 51 is applied on or under the edge 48 of said muscle 22 or 23 so as to form a single connecting zone, the connecting means cooperating with holes 53 and some of the perforations 54 formed in edge 48.

The fabric portion 47d associated with the wear strip 44 has a special feature, intended to form, in this low part of skirt 5, a reinforcement of the structure.

For this, the fabric portion 47d is associated with a second reinforcement fabric portion 55 which can be seen in FIGS. 8 and 8B. The reinforcement fabric 55 is connected, along its upper edge, for example by bolting, to the fabric portion 47d and, along its lower edge, to a wear strip 56 disposed opposite the wear strip 44. Strips 44 and 56 are connected together by a narrow inner strip 57 whose longitudinal edges are each fixed, by any appropriate means, in the vicinity of the lower edges of strips 44 and 56 respectively, as can be better seen in FIG. 8A. Strip 57 has a succession of central perforations 58. The two lower edge zones of strips 44 and 56, forming two continuous free louvers, are thus left free.

Figure 9:
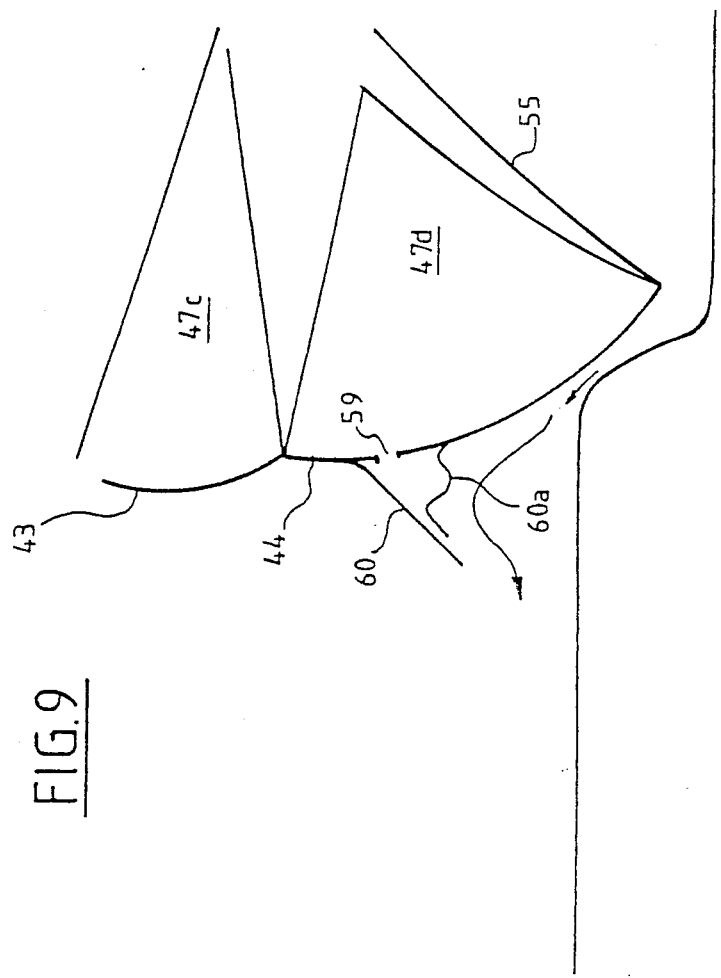
FIG. 9 shows a schematical section of the lower region of the skirt showing the device external thereto which is intended to reduce the spray and the dust (raised respectively on sea and on land)

FIG. 9 illustrates the device which the wear strip carries externally for reducing the spray and dust, during operation of vehicle 1. Strip 44 has, in the vicinity of its upper edge, a slit 49. On each side of this slit 49 are disposed externally, on the one hand, an upper mobile flap 60 and, on the other, a lower flexible louver 60a.

THE PERIPHERAL TUBE 32 AND THE INNER TUBES 33 AND 34

With the perforated or porous zone 42 of portion 40 of skirt 5 is associated the peripheral tube 32 (FIG. 6), formed by two bands 61, 62, one 61 disposed outwardly of the porous portion 42 and the other 62 inwardly, the assembly being shown schematically in FIG. 6. Thus, bands 61 and 62 penetrate by one of their edges, made rigid by flexible rods 64, into a tube 64 associated with hoop 41 and, by their opposite edges, they are fixed for example by bolting to the fabric portion forming sections 42 and 43 of skirt 5.

The inner band 62 has a succession of central perforations 63. Against this inner perforated band is disposed the tube 33 (or tube 34), which is held against tube 32 by two lateral bands 64a and 65b having central perforations respectively 66a and 66b.

DIVIDING WALLS 17 AND 18

They will be described with reference to FIG. 10, more particularly.

Each dividing wall 17 or 18 is formed of two opposite walls 67 and 68, each having a main strip respectively 69 and 70 and a lower wear strip respectively 71 and 72. The shaping of these walls 67 and 68 is achieved by means of fabric systems 73, disposed at intervals and each formed by two semisystems each of which is substantially similar to a system 47 associated with skirt 5.

Thus we find a semiassembly formed of two upper fabric sections 73a and 73b, similar in so far as structure and fitting are concerned, to fabric portions 47a to 47c described above and associated with main strips 69 and 70 and with a lower fabric portion 73c, similar to fabric portion 47d and associated with the wear strip 71 or 72.

All the connecting strips 74 (which are similar in structure and mounting to the above described strips 51) associated with fabric portions 73a to 73c of a semi assembly are fixed, by their end opposite said fabric portions 73a to 73c, to one of the two muscles associated with the dividing wall considered. There exists, in fact, for each assembly, a second semiassembly of fabric portions, immediately adjacent the first one and parallel thereto, which is disposed symmetrically with respect to the mean plane of the dividing wall, and which is connected to the symmetrical muscle.

Furthermore, the two lower edges of the wear strips 71 and 72 form two continuous facing louvers.

As can be seen in FIG. 1, the ends of the longitudinal 17 and transverse 18 dividing walls extend into the peripheral space of the air cushion defined by skirt 5. At this level, at least one of the two opposite strips defining each dividing wall 17 or 18 has at least one orifice 75 (FIG. 1) causing said inner zone of the dividing wall 17 or 18 considered with the peripheral tube 32.

DUCTING 19

Figure 2:
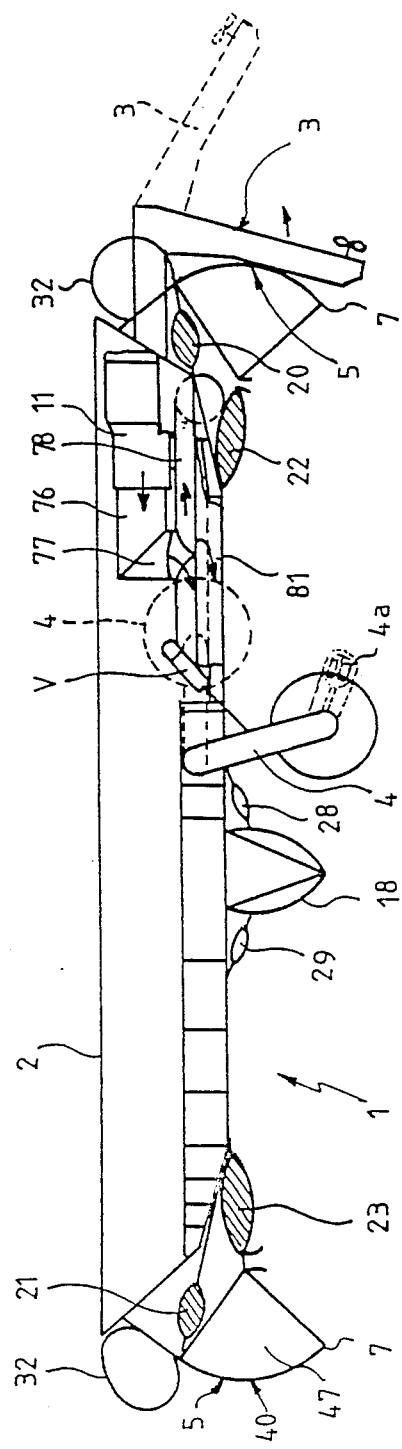

It comprises successively a first flexible branch 76, disposed in the axis of branch 11, FIG. 2, then a second flexible branch 77, perpendicular to the first one, from which it divides into two arms, the first one 78 which forks off in the direction of the blower 8 and, which, through connecting channels 79 and 80, supplies the muscles 20 and 22 respectively of chamber 13, and the second one 81 which extends as far as the front end of vehicle 1. This second arm 81 has the feature of being divided into two superimposed parts; the upper semihalf supplies, in chamber 13, on the one hand muscle 20 through the connecting channel 82 and, on the other hand, muscle 22 through the connecting channel 83; as for the lower semihalf it supplies, in chamber 14, on the one hand muscle 21 through connecting channels 84 and 85 and on the other hand muscle 23 through connecting channels 86 and 87.

MUSCLES 20 TO 23 AND 24 TO 31

General description

This description will be given with reference to FIGS. 12, 12A and 12b. Each muscle is formed of two superimposed strips 88 and 89, joined together along their two edges 90 and 91, so as to form two double thickness edges, each having a succession of holes 92. At intervals, inside the space situated between strips 88 and 89, are mounted members of the valve type each formed of a main strip 93 disposed perpendicularly to strip 88, in the mean longitudinal plane of the muscle, said strip 93 being joined at its end opposite strip 88, along the mean transverse line of strip 94 which has, on each side of its junction zone with strip 93, openings 95 (FIG. 12A), and which is fixed, by its two opposite transverse edges, to the lower strip 89. This latter has, in line with the median region of strip 94, a hole 96.

Features of the lower muscles 22 and 23 associated with skirt 5 and of muscles 24 to 31 associated with dividing walls 17 and 18.

The muscles shown in FIGS. 12, 12A and 12B are in fact muscles of the above mentioned type. It will then be noticed in FIG. 12B particularly, that these muscles have, at their lower part, three pairs of longitudinal flaps 97 for guiding the air leaving the two lateral rows of holes 92 and the central row of holes 96. (The upper muscles 20 and 21 do not have such flaps).

As mentioned with reference to the description of skirt 5 and its shaping means, the lower muscles 22 and 23 are disposed between the fabric portion systems 47 and the base of structure 2. As for muscles 24 to 31, they are fixed, along their opposite edges, to dividing walls 17 and 18, also under structure 2.

FEATURES OF THE UPPER MUSCLES 20 AND 21

They extend above the fabric portion systems 47 and are joined, along one of their edges, to skirt 5 just below the tube 32 (FIG. 6) and, along their opposite edge, to the same position on structure 2 at which the lower muscles 22 and 23 are joined (FIG. 1). The connecting means are formed by perforated fabric portions.

Another feature is that, in the front chamber 14, one of the valves of muscle 21 supplies, through a bent pipe 98 disposed under said muscle 21, the tube 38 which is intended to regulate the pressure in the general duct 19; this assembly can be seen in FIG. 4 and in FIG. 16.

THE MUSCLES ASSOCIATED WITH THE DIVIDING WALLS

Their systems of attachment to dividing wall 17 or 18 has already been described. Along their opposite edge they are attached to the base of structure 2 (FIG. 10) by fabric portions. The fabric portion connecting them to system 73 is perforated. Furthermore, they are supplied through channels (referenced 24a and 25a in FIG. 10, since they are associated with muscles 24 and 25).

THE TUBE 38

It has been shown more particularly in FIG. 16. It is in communication with the bent pipe 98. Furthermore, it is held against duct 19 by strips 99 provided with holes 100.

Duct 19 further has a hole 101 opposite tube 38.

In the following description of the operation of vehicle 1, the pressure of the air delivered by blower 8 into muscles 20 to 23 will be designated by PG, or generating pressure, and by PS av. and PS arr., the static lift pressure which reigns in the lift chambers, respectively at the front and at the rear, except for the leak rates, vehicle 1 being in a horizontal position with respect to the surface over which it travels. The PS arr. is always a little greater than PS av., because the center or gravity is always offset rearwardly.

STARTING UP

Let us suppose that vehicle 1 is on the sea. It floats on its central hull, wheels 4 being raised. The blower 8 is started up which supplies first of all the main duct 19. Muscles 20 to 23 are inflated first; once muscles 20 to 23 have been inflated to the maximum, blower 8 then feeds into the peripheral tube 32 because of the PITOT effect. At that time, the general supply for the cushion takes place through the peripheral tube 32, via tubes 33 and 34 which regulate the flow rate for each of the chambers. The longitudinal 17 and transverse 18 dividing walls are inflated, the air penetrating therein through orifices 75.

The vehicle 1 rises so as to place itself in stationary flight as far as its balanced position. The bottom of the hull is at a height H, for example 1mm, the leak height h being of the order of 10 mm (even less than 10 mm) at the bottom of skirt 5.

With wheels 4 raised, the Z control 3 of the propeller is actuated (low position), so that the vehicle 1 moves with its aquatic propulsion, the dirigibility being provided through rotation of the Z controlling the propeller 3, turbine 8 delivering a constant speed. The bottom of the hull is held at a constant height with respect to the surface of the water, by the regulation due to the valves of muscles 22, 23 and 24 to 30, which ensure a constant balanced position.

Figure 13:
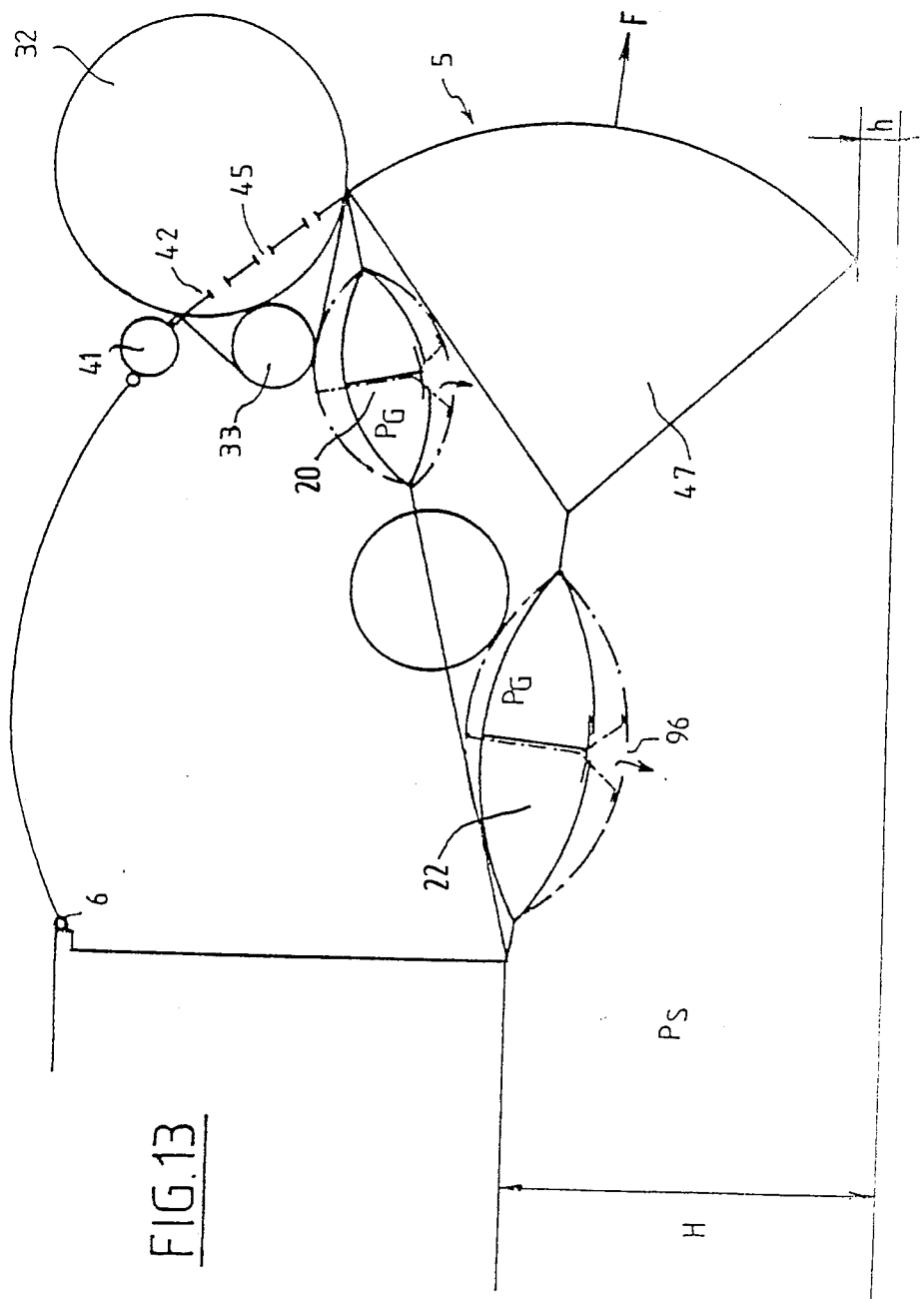

To illustrate this regulation, reference will be made to the explanatory diagram of FIG. 13. If the static pressure PS, following a variation of the position of the center of gravity or a variation of the load, reduces in any chamber, skirt 5 retracts, the lower muscles 22 and 23 as well as the upper muscles 20 and 21 are inflated, which is shown by dot dash lines in FIG. 13, the leak holes 96 open, the internal pressure PG of muscles 20 to 23 drops so as to resume a new balance value close to the first one (within a millimeter) and, consequently, the apparatus is stabilized at its flight height.

Figure 14:
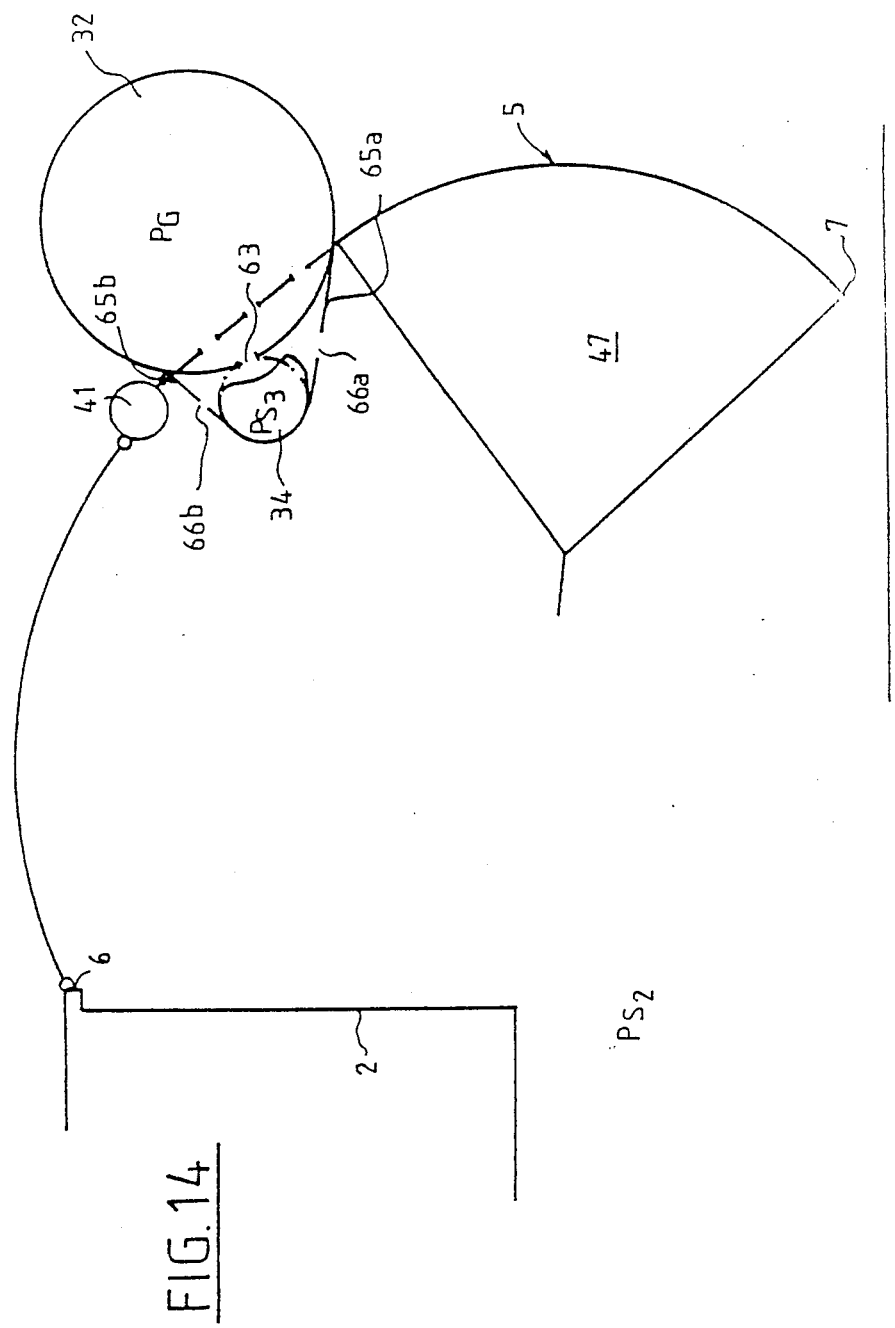

Let us now suppose that vehicle 1 is in stationary flight. The static pressure in the rear chamber 13 is higher than the static pressure in the front chamber 14. The result is that tube 34 of the front chamber 14 is at the static pressure which reigns in rear chamber 13 following opening of the valve 37 of tube 34. Under these conditions, holes 63 are partially closed by tube 34, which passes into the position shown with dot dash lines in FIG. 14 and gives to holes 63 of the peripheral tube 32 associated with the front chamber 14 the same outlet conditions as holes 63 of tube 32 associated with the rear chamber 13. The result is the same leak flow from the two front and rear chambers.

Of course, the situation is the same for the left hand half of vehicle 1. The result is a uniform rate throughout the vehicle 1, whatever its load and the position of its center of gravity and, independently of obstacles met with.

Figure 15:
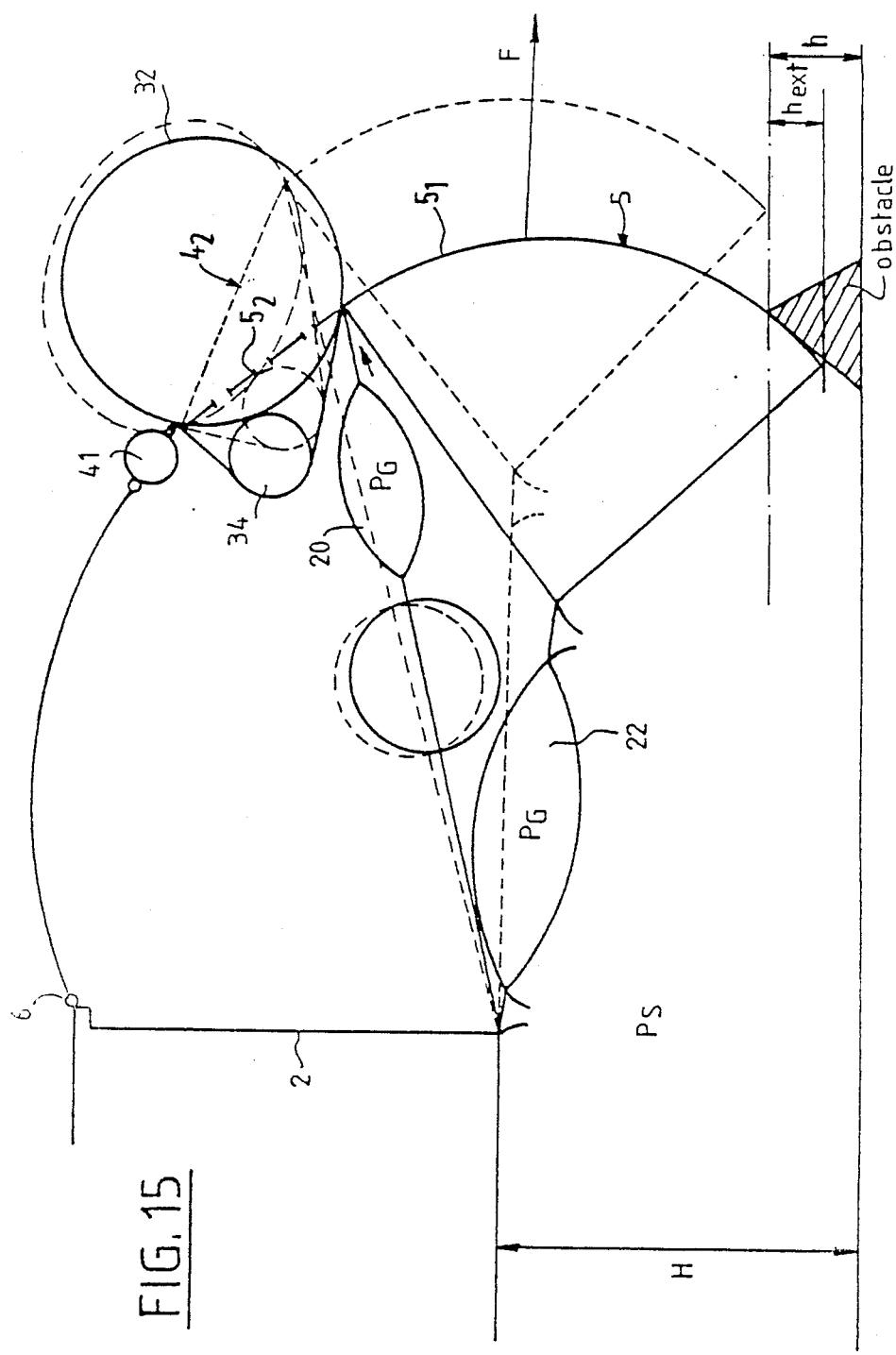
Figure 18:
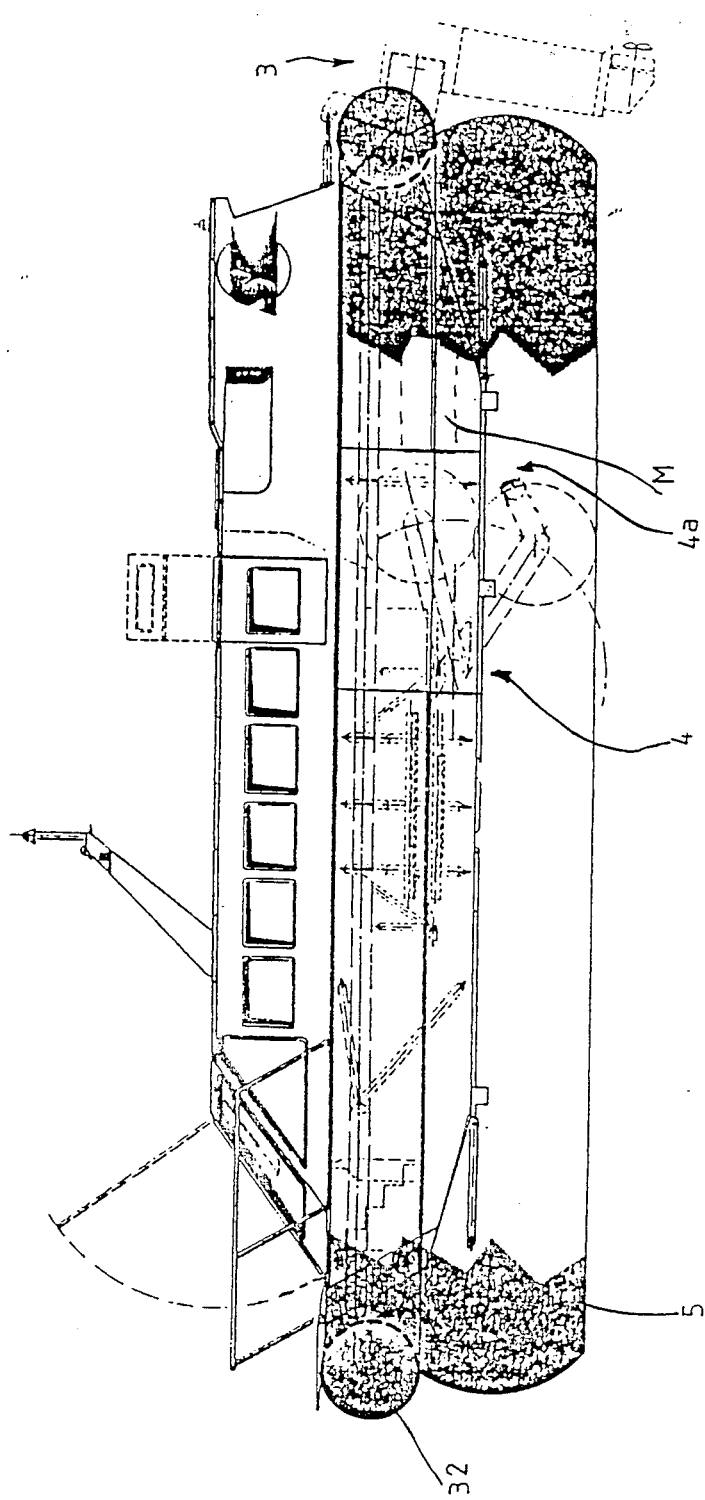
FIG. 18 is a schematical elevational view of a vehicle in accordance with the invention.

The phenomena will now be described which occur when an obstacle is met with or during a dynamic disturbance (for example, change of plane through meeting a wave). Reference for this will be made to the diagram of FIG. 15.

When an obstacle 0 is met, the tractive force F which is exerted on skirt 5 increases, the differential pressure between the pressure PG reigning in the muscles and the static pressure PS drops, the muscles lengthen out (their new position is shown with broken lines in FIG. 15), and a raising movement of skirt 5 is obtained. The muscle 20 commands locally the displacement of the upper edge A to A' when the skirt is rising, while muscle 22 commands local displacement of the lower edge B to B'. The movement of skirt 5 takes place over a height hext, whence the shock absorbing height increases considerably; it may even be multiplied by 20. With the hull moving from this height, shock absorbing takes place no longer over a height h but over a height which may reach 20h, being on average 10h.

The movement of the upper muscle 20 (or 21) counterbalances directly the upper part of tube 32 and prevents having a lower muscle 22 (or 23) of too large a size, and allows the path of movement of skirt 5 to be controlled at the same time with a negative volume variation.

We will now explain, with reference to FIG. 16, how responses to the different forces are obtained which are identical whatever the load. In other words, if the initial natural frequency is adjusted about 2Hf, arrangements are made so that this natural frequency remains at the same value independently of the load and of its distribution (movement of the passengers, weight of the fuel, loads, etc).

The solution chosen is that of regulating the generating pressure supplying the muscles of the front chamber 14.

If the static pressure PS in the rear chamber 13 is superior to the static pressure PS in the front chamber 14, muscle 21 retracts, the pressure which is established therein has a value P'G<to PG. At that time, the air had escaped through conduit 98 to pass into tube 38 in which the pressure P'G was established. This tube 38 closed the general supply tube 19 in which an initial pressure of PG reigned. Since P'G is less than PG, hole 10 is freed and causes PG to drop to P'G in duct 19 which supplies muscle 21. Thus, tube 38 is a tube for regulating the supply of the muscles with the generating pressure P'G initially taken. This allows a new stiffness to be obtained on return of skirt 5 and the same response whatever the load of vehicle 1.

Furthermore, in order also to overcome the variations of pressure delivered by blower 8 in so far as the natural frequency of the vehicle is concerned, regulation by means of the rear chamber 13 is also provided.

Let us look now at the situation concerning the longitudinal 17 and transfer 18 dividing walls. In the stationary position, the muscles associated with the internal dividing walls are at a pressure PG, in the same way as the internal space of these dividing walls 17 and 18. When an obstacle is present, the associated dividing walls sustain the pressure through the obstacle, and the muscles undergo a greater traction and place the whole of the dividing walls in a new balanced position with respect to the obstacle, by reducing the friction surface in contact with the obstacle (position shown in broken lines in FIG. 17). The result is reduction in the drag forces.

If the vehicle is rolling (change of slope), over the part where the leak height decreases, for example the right hand part of FIG. 17A, the static pressure in the rear chamber 13 tends towards the generating pressure PG. The muscle 24 has no longer any force. Muscle 25 will contract and will draw part 67 of dividing wall 17 until its internal valve opens, which will result in a movement of said part 67 of dividing wall 17 proportional to the shock absorbing roll angle which the vehicle will have undergone, since the external skirt, because of its mobility, induces a shock absorbing roll angle.

The operation of the spray deflector, which has been shown in FIG. 9, will now be explained. In stationary flight, the air will be ejected between the water and the bottom of skirt 5 causing an upward movement of water in the form of droplets, which are beaten back by deflector 60.

It is an operation similar to the one described above which is used for travelling overland or over shallow water. In this case, however, the propeller propulsion device 3 is in the high position, as shown with a dot dash line in FIG. 2 and the wheel device 4 and at least two faired propellers 4a are in the low position. The vehicle is then driven from motor M or another motor and the kinematic chain of device 4 including, in a way known per se, a clutch E with which are associated a gear box and a differential D, FIG. 5. Regulation of the lift, on passing over obstacles and of the response to external forces are as described above travelling over water.

I claim:
1. A surface effect transport vehicle comprising:
first means for sustaining said vehicle;
second means for propelling said vehicle, said first means being independent from said second means;
a supported structure supported by a cushion of pressurized air generated from said first means;
a flexible skirt delimiting said air cushion;
flexible wall means dividing said air cushion into at least two chambers;
third means for controlling sustention of said vehicle, trim of said vehicle and platform stability of said vehicle during a dynamic disturbance;
said third means including means for ensuring an identity of response of said vehicle to different outside forces independent of a total loading of said vehicle;
said skirt comprising at least two portion means for varying the negative volume of the sustention space, a first of said two portion means being fixed, along one of its edges, to said supported structure and, along the other of its edges, to a rigid hoop surrounding said supported structure, a second of said two portion means including a first section adjacent to said rigid hoop and a second section fixed to said first section; and
muscle means including at least two pneumatic muscles connected to said skirt for controlling at least one of shock absorbtion of said vehicle and damping of the platform of said vehicle by varying the geometric shape of at least one of said sections of said second portion of said skirt whereby said vehicle is maintained in its original sustented position to achieve platform stability.

2. The vehicle according to claim 1, wherein said first section is pierced to provide a plurality of openings and said second section includes at least a pair of subsections, one of said pair of subsections being integral with said first section and another of said pair of subsections forming a lateral wear strip fixed to said first subsection by bolts.

3. The vehicle according to claim 2, wherein said lateral wear strip includes, on the external face thereof, a flap and a louver for deflecting spray and dust met during travel of said vehicle over water and over land.

4. The vehicle according to claim 1, wherein said wall means include:
a substantially longitudinal dividing wall and a transverse dividing wall, said transverse dividing wall being substantially orthogonal to said longitudinal dividing wall;
said longitudinal and transverse dividing walls dividing said air cushion into four of said chambers and having at least one wall orifice communicating with the peripheral space of the air cushion defined by said skirt;
said muscle means further include longitudinal and transverse sets of pneumatic muscles for modifying the geometric shape of said longitudinal and said transverse walls; and
said vehicle further includes a set of fabric systems, one said system being disposed perpendicularly to said skirt and the other of said systems being connected with said longitudinal and said transverse walls, and a plurality of muscle connection strips connecting said at least two muscles to said skirt and said longitudinal and said transverse muscles to said longitudinal and said transverse walls.

5. The vehicle according to claim 4, wherein each of said muscle connection strips is bent back on itself along its longitudinal median line and has transverse edges, each said transverse edge having a row of holes for the passage of bolts for fixing said strips to said set of fabric systems, on the one hand, and to the said muscle associated therewith, on the other.

6. The vehicle according to claim 4, wherein said one fabric system includes fabric portions which are triangular, after folding and other fabric portions with a quadrilateral contour joined together so that said peripheral skirt is constantly in a stretched position during operation of said vehicle.

7. The vehicle according to claim 4,
said second section including a pair of subsections;
the first said subsection being integral with said first section and the second said subsection forming a lateral wear strip fixed to said first subsection;
the part of said one fabric portion associated with said lateral wear strip of said peripheral skirt being reinforced by means of a transverse fabric portion, connected to a lower wear strip disposed on the underside of said skirt, adjacent said lateral wear strip and at a distance therefrom; and
a lower strip connecting said lateral and lower wear strips and having a row of central perforations.

8. The vehicle according to claim 4,
said muscle means comprising a pair of upper and lower muscles respectively connected to said upper and lower sections of said skirt;
each of said muscles include a pair of flexible superimposed strips being joined along their lengthwise edges and having means for joining one of its said lengthwise edges to one of said muscle connection strips and the other of its said lengthwise edges to said supported structure;
a plurality of valve type members, each said valve type member being formed by a pair of strip devices, one said strip device being connected, at opposite ends, to one of said superimposed strips and the other of said strip devices connecting said one strip device, between its ends, to the other of said superimposed strips; and
a central row of leak holes defined in said one superimposed strip, beneath the said strip devices, said lower muscles associated with said peripheral skirt and said longitudinal and said transverse sets of muscles, associated with said longitudinal and transverse dividing walls includes a a plurality of pairs of longitudinal louvers for guiding the air escaping through a set of lateral perforations defined in lateral rows in the said lengthwise edges of said muscles and said leak holes defined in the said one superimposed strip of said muscles.

9. The vehicle according to claim 4,
said muscle means including a set of upper and lower muscles respectively connected to said first and second sections of said skirt; and first section having a row of circumferential perforations in said first section;
a distribution duct connected to said upper and lower muscles; and
said first means including a blower connected to said distribution duct, and an inflatable external peripheral tube connected to said blower;
said peripheral tube enclosing said first section of said skirt and having a row of outlet openings located inside said skirt; and
air cushion valve means including a series of inflatable inner tubes, having ends adjacent said longitudinal and transverse dividing walls for controlling leak flow of the air eminating from said outlet openings, said inner tubes being associated with said external peripheral tube by means of lateral strips having central perforations for passage of air from said external peripheral tube for supplying said air cushion.

10. The vehicle according to claim 9, wherein each of the ends of said inner tubes pass through said median and transverse walls to which they are adjacent by duct means for controlling the inflation of said inner tubes by the pressure reigning in said dividing walls.

11. The vehicle according to claim 9,
said upper and lower muscles including regulation means for regulating their internal pressure to equal the static pressure of said air cushion;
said response ensuring identity means includes said distribution duct having a regulation aperture at its inlet zone, an inflatable regulation tube adapted to seal and unseal said regulation aperture by collapsing when the static pressure of said air cushion is less than that of air within the distribution duct; a pipe connecting said regulation tube to said regulation means;
a connecting strip, having regulation perforations, connecting said regulation tube to said distribution duct, whereby, when the static pressure of said air cushion is less than that within said distribution duct and the pressure within said upper and lower muscles equals that of said air cushion, said regulation perforations equalize said static pressure within said distribution duct to that of said air cushion and thereby ensure that the response of said muscles to a change in pressure of said air cushion is always substantially identical to a given static pressure of said air cushion.

12. The vehicle according to claim 11, wherein said third means include said upper and said lower muscles having leak hole means responsive to variations of the static pressure in said lift chambers occasioned by variations in the center of gravity of said vehicle for regulating the internal pressure of said muscles and the static pressure of said lift chambers to control said platform stability of said vehicle.

13. The vehicle according to claim 12, wherein said duct means include valves for equalizing the pressure between said inner tubes, located adjacent to one another, so that the static pressure in said chambers, located adjacent to one another, will also be equal and the leak rate of air will be substantially the same in said adjacent chambers when said vehicle is in stationary flight.

14. The vehicle according to claim 4, wherein said longitudinal and transverse sets of muscles are controlled from the pressure reigning in said dividing walls to which they are connected by a set of channels.

15. The vehicle according to claim 1, wherein said hoop is connected to said support structure by means of a deformable articulated framework.

16. The vehicle according to claim 1, wherein
each of said at least two muscles have means, responsive to a pressure drop within said at least two chambers, for equilizing pneumatic pressure within said at least two muscles to said pressure drop and means, responsive to a drop in pneumatic pressure within said at least two muscles for lengthening said at least two muscles; and
said change in geometric shape includes increased height of said skirt produced by said lengthening of said at least two muscles whereby when said pressure drop is produced by said vehicle passing over an obstacle, the height of said skirt is increased to increase the shock absorbing ability of said vehicle.

17. The vehicle according to claim 1, wherein said third means is connected to said first means and said third means simultaneously control the sustention of said vehicle, the attitude of said vehicle and its stability at the time of a dynamic disturbance.

18. A surface effect transport vehicle comprising:
a supported structure;
blower means for generating a cushion of pressurized air to support said supported structure;
propulsive means, independent of said blower means, including:
at least one retractable propeller device adapted to be made operative during travel over the water and nonoperative during travel over land; and
at least one retractable wheel device for travelling over land or in shallow water which is operative when said propeller device is retracted to its nonoperative condition and made inoperative when said propeller device is in its operative condition;
at least one hoop surrounding said supported structure;
a flexible skirt of modifiable shape including at least two portion means, a first of said two portion means connecting said at least one hoop to said supported structure, and a second of said two portion means connected to said at least one hoop and extending from said at least one hoop so as to be adjacent the surface over which said vehicle moves;
a deformable articulated framework connected said at least one hoop to said supported structure;
wall means forming at least four chambers limited at their external periphery by said flexible skirt and inwardly by such wall means, said wall means, including at least one longitudinal dividing wall and at least one transverse dividing wall, substantially orthogonal to said longitudinal dividing wall, said at least one longitudinal and said at least one transverse dividing wall being of modifiable shape and having at least one wall orifice communicating with the peripheral space of the air cushion defined by said skirt; and
control means, connected to said supported structure, for simultaneously controlling lift of said vehicle, attitude of said vehicle, and stability of said vehicle at the time of dynamic disturbance, said control means including:
means for ensuring the identity of the response of said vehicle to different outside forces independent of the loading of said vehicle; and means for slaving the static pressures of said air cushion, reigning in adjacent chambers, to one another.

19. The vehicle according to claim 18, wherein said second of said two portion means includes:
   a section adjacent said hoop pierced to provide a plurality of openings in said section; and
   a pair of subsections, a first of said pair of subsections integral with said section and a second of said pair of subsections forming a lateral wear strip.

20. The vehicle according to claim 19, wherein, the part of said one fabric portion associated with said lateral wear strip of said peripheral skirt is reinforced by means of a transverse fabric portion connected to a lower wear strip disposed opposite said lateral wear strip and at a distance therefrom and a lower strip connecting said lateral and lower wear strips, and having a row of central perforations.

21. The vehicle according to claim 19, wherein said lateral wear strip includes, on the external face thereof, a flap and a louver for deflecting spray and dust met during travel of said vehicle over water and over land.

22. The vehicle according to claim 18, wherein said control means includes:
   muscles means for modifying the shape of said peripheral skirt and said at least one longitudinal and said at least one transverse dividing walls;
   a set of fabric systems, one said system being disposed perpendicularly to said skirt and the other said system disposed perpendicularly to said at least one transverse and longitudinal walls; and
   a plurality of muscle connection strips connecting said muscle means to said one fabric systems and said other fabric systems, each of said muscle connection strips being of elongate configuration bent back on itself along its longitudinal median line and having a pair of transverse edges, each said transverse edge having a row of holes for the passage of bolts to fix one said transverse edge to said supported structure and to fix the other said transverse edge to said muscle means associated therewith.

23. The vehicle according to claim 18, wherein said control means includes:
   a first set of muscles for modifying the shape of said peripheral skirt; and
   a second set of muscles for modifying the shape of said at least one transverse and said at least one longitudinal dividing walls;
   a set of fabric systems, one said fabric system disposed perpendicularly to said skirt and the other of said fabric systems disposed perpendicularly to said at least one longitudinal and said at least one transverse dividing walls;
   a set of muscle connection strips connecting said first and second sets of muscles to respectively said one fabric system and said other fabric systems; and
   said one fabric system including fabric portions which are triangular, after folding and other fabric portions with a quadrilateral contour, joined together so that said peripheral skirt is constantly in a stretched position during operation of said vehicle.

24. The vehicle according to claim 23, wherein at least one pair of channels connect said second sets of muscles to said at least one longitudinal and said at least one transverse dividing walls to control said second sets of muscles from the pressure reigning in said at least one longitudinal and said at least one transverse dividing walls.

* * * * *